3,185,743
PRODUCTION OF OLEFINIC COMPOUNDS
FROM ALLYL SULFONES
Edward M. La Combe, Charleston, and Byron Stewart, South Charleston, W. Va., assignors to Union Carbide Corporation, a corporation of New York
No Drawing. Filed Aug. 24, 1960, Ser. No. 51,536
1 Claim. (Cl. 260—682)

This invention relates to novel processes for producing olefinic or ethylenically unsaturated compounds. This application is a continuation-in-part of an application entitled, "Olefinic Compounds and Processes Therefore," Serial No. 728,794, filed April 16, 1958, now abandoned.

Olefinic or ethylenically unsaturated compounds are commonly prepared by many processes, for example, by the dehydration of alcohols or by "cracking" their corresponding esters, by the "cracking" or dehydrogenation of paraffin compounds, by the removal of hydrohalic acid from an alkyl halide, by the removal of two halogen atoms attached to adjacent carbon atoms of an alkyl dihalide, by the selective reduction of alkynes, or by the union of two dihalogen-containing alkyl molecules. All of these methods, however, have one or more disadvantages, and the types of olefinic compounds that can be prepared thereby are limited.

It has now been found that olefinic or ethylenically unsaturated compounds of many classes, many of which were heretofore incapable of preparation, can be readily produced in good yield and purity by heating an ethylenically unsaturated sulfone, i.e., an allyl sulfone, at an elevated temperature, whereby sulfur dioxide is eliminated and an olefinic compound is produced. Among the preferred sulfone starting materials for use in this invention are the mono-unsaturated mono-sulfones in which the sulfonyl group is attached to two aliphatic carbon atoms, for example, the allylic sulfones and the substituted allylic sulfones; the di-unsaturated mono-sulfones, for example, the diallylic sulfones and the substituted diallylic sulfones; and the unsaturated di-sulfones, for example, the bis-allylsulfonyl hydrocarbons and the substituted bis-allylsulfonyl hydrocarbons, as will hereinafter be shown in further detail. The preferred sulfones are those in which the sulfonyl radical is attached to two aliphatic carbon atoms. Sulfones in which the sulfonyl radical is attached to one aliphatic carbon atom and to one aromatic carbon atom can also be used but they are difficult to react and result in very low yields of desired products.

The process of this invention is carried out by heating the unsaturated sulfone at a temperature above about 175° C., but below the temperature at which such decomposition occurs that the starting sulfone or the products produced therefrom are carbonized. As a simple illustrative example, heating allyl methyl sulfone at about 200° C. produces 1-butene with the simultaneous formation of sulfur dioxide.

The unsaturated sulfones which can be used as starting materials in this invention can be represented by the general formula:

$$R''-SO_2-(X-SO_2)_n-R'''$$

wherein R'' represents an allylic radical or a substituted allylic radical as is hereinafter further defined; R''' represents an unsubstituted or substituted allyl radical similar to R'', or an unsubstituted or substituted aliphatic hydrocarbon radical similar to R', as is hereinafter further defined; X represents a divalent saturated or unsaturated hydrocarbon radical, or a substituted divalent saturated or unsaturated hydrocarbon radical as is hereinafter further defined; and $n$ is an integer having a value of 0 or 1.

The mono-unsaturated mono-sulfones which can be used as starting materials in this invention are the allyl sulfones which can be represented by the following general formula:

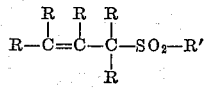

wherein the various R groups represent the same or different radicals, for example, hydrogen atoms, halogen atoms, cyano radicals, alkoxy radicals, aryloxy radicals, carboalkoxy radicals, carboaryloxy, radicals, acyloxy radicals, aroyloxy radicals, carboalkyl radicals, carboaryl radicals, and monovalent hydrocarbon radicals such as the linear and branched alkyl radicals, cycloalkyl radicals, aryl radicals, alkaryl radicals, aralkyl radicals and including substituted monovalent hydrocarbon radicals wherein the substituents on the hydrocarbon radical can be halogen atoms, cyano radicals, alkoxy radicals, aryloxy radicals, carboalkoxy radicals, carboaryloxy radicals, acyloxy radicals, aroyloxy radicals, carboalkyl radicals and carboaryl radicals; and R' represents a monovalent saturated alkyl radical, cycloaliphatic radical, or aralkyl radical and including the substituted radicals thereof as hereinafter shown. It has been found that alcoholic hydroxyl groups interfere with the reaction in certain instances, but that phenolic hydroxyl does not.

The di-unsaturated mono-sulfones which can be used as starting materials in this invention are the bis-allyl sulfones which can be represented by the following general formula:

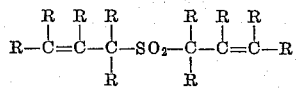

wherein the various R groups have the same meanings as hereinbefore defined.

The unsaturated disulfones which can be used as starting materials in this invention are the diallyl disulfones which can be represented by the following general formula:

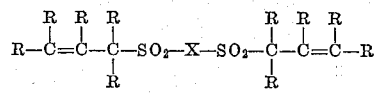

wherein the various R groups have the same meanings as hereinbefore defined; and X represents an unsubstituted or substituted divalent saturated hydrocarbon radical, for example, a divalent alkyl radical containing from 2 to about 20 carbon atoms, preferably from 2 to about 10 carbon atoms, such as ethylene, 2-methylbutylene, octylene and the like, or a divalent aryl radical, such as phenylene and the like, or a divalent unsaturated alkenyl radical containing from about 4 to about 20 carbon atoms, preferably from about 4 to about 10 carbon atoms, such as 2-butenylene, 3-hexenylene, and the like.

The following information is offered to clarify the meanings of some of the above terms used to designate various radicals. Since the terms hydrogen atoms, halogen atoms, cyano radicals, alkoxy radicals, aryloxy radicals and hydrocarbon radicals are so well known, no attempt is being made to further explain them. The term "carboalkoxy radical" is used to designate a radical as represented by the formula

for example, the radical

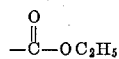

which is carboethoxy. The term "carboaryloxy radical" is used to designate a radical as represented by the formula

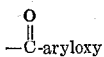

for example,

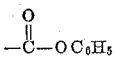

which is carbophenoxy. The term "acyloxy radical" is used to designate a radical represented by the formula

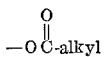

for example,

which is acetoxy. The term "aroloxy radical" is used to designate a radical represented by the formula

for example,

which is benzoyloxy. The term "carboalkyl radical" is used to designate a radical represented by the formula

for example,

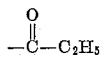

which is carboethyl. The term "carboaryl radical" is used to designate a radical represented by the formula

for example,

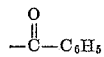

which is carbophenyl. Also, when the term "carboaloxy substituted hydrocarbon radical" is used, it represents a hydrocarbon radical which has a carboalkoxy substituent thereon; for example, the radical

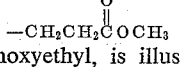

which is carbomethoxyethyl, is illustrative of a carboalkoxy substituted alkyl radical. In like manner, one can determine the substituents on the other hydrocarbon radicals; additional examples of the radicals which R and R' can represent are hereinafter disclosed.

The general reaction involved when mono-unsaturated mono-sulfones are reacted by the process of this invention can be illustrated by the following general equation, wherein R and R' have the same meanings defined above:

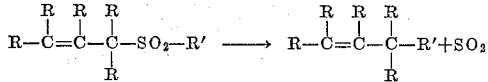

With di-unsaturated mono-sulfones the general reaction which such compounds undergo can be illustrated by the general equation:

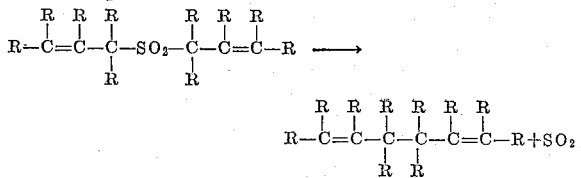

and with unsaturated disulfones the general reaction which such compounds undergo when reacted by the processes of this invention can be illustrated by the general equation:

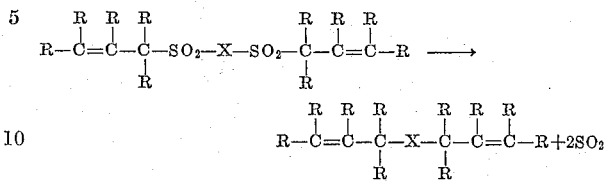

The unsaturated radicals attached to the —SO$_2$— radical can, for simplicity of description, be called monovalent hydrocarbenyl radicals, and in this term are included those substituted radicals which have substituents other than hydrogen atoms attached to the carbon atoms. Thus the unsaturated hydrocarbenyl radical:

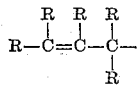

corresponding to R'' is called the ethylenically unsaturated monovalent hydrocarbenyl radical to distinguish it from the saturated R' radical corresponding to R''', which is called the monovalent hydrocarbyl radical.

Illustrative of the radicals which R' can represent there may be mentioned the linear and branched alkyl radicals containing up to about 20 or more carbon atoms, the cycloaliphatic radicals containing up to about 7 carbon atoms in the ring, and the aralkyl radicals. The substituents on the hydrocarbon radicals can be halogen atoms, cyano radicals, alkyl radicals, aryl radicals, alkoxy radicals, aryloxy radicals, carboalkoxy radicals, carboaryloxy radicals, acyloxy radicals, aroyloxy radicals, carboalkyl radicals, carboaryl radicals, and the like.

Among the alkyl and substituted alkyl R' radicals there can be mentioned: methyl, ethyl, propyl, isopropyl, t-butyl, 2-ethylhexyl, t-amyl, t-octyl, nonadecyl, cyclohexyl, chloropropyl, bromobutyl, dichloropentyl, cyanopropyl, cyanooctyl, cyano-t-butyl, propoxyethyl, chloroethoxyhexyl, methoxycyanopentyl, phenoxybutyl, dichlorophenoxyethyl, tolyloxypropyl, carbobutoxyethyl, carbomethoxypropyl, carbophenoxyethyl, carbotolyloxypropyl, carbochlorophenoxypropyl, acetoxyethyl, propionoxybutyl, benzoyloxypropyl, chlorobenzoyloxyethyl, carbomethylethyl, carbobutylpentyl, carbochloroethylpropyl, carbopropylethyl, carbophenylethyl, carbotolylethyl, carbophenylisopropyl, carbophenylcyanobutyl, and the like.

Among the aralkyl and substituted aralkyl R' radicals there can be mentioned: benzyl, phenethyl, alphaphenylethyl, chlorobenzyl, chlorophenylethyl, omega-(dichlorophenyl)-butyl, cyanophenethyl, methoxybenzyl, phenoxybenzyl, methylbenzyl, dimethylbenzyl, butylbenzyl, phenylbenzyl, chlorophenylbenzyl, carbomethoxybenzyl, carbophenoxybenzyl, acetoxybenzyl, benzoyloxybenzyl, carbomethylbenzyl, carbophenylbenzyl, and the like.

Among the radicals which the various R groups can represent there may be mentioned: hydrogen atoms; the halides, chlorine, bromine, and iodine; cyano radicals; the alkyl and substituted alkyl radicals listed above as representing R'; the aralkyl and substituted aralkyl radicals listed above as representing R'; the aryl and substituted aryl radicals, such as phenyl, naphthyl, biphenylyl, chlorophenyl, dichlorophenyl, bromonaphthyl, cyanophenyl, cyanonaphthyl, methoxyphenyl, chloroethoxyphenyl, phenoxyphenyl, chlorophenoxyphenyl, tolyloxyphenyl, phenoxychlorophenyl, carbomethoxyphenyl, carboethoxynaphthyl, carbophenoxyphenyl, carbochlorophenoxyphenyl, carbotolyloxyphenyl, acetoxyphenyl, benzoyloxyphenyl, carbomethylphenyl, carboethylphenyl, carbophenylphenyl, carbotolylphenyl, and the like; the alkaryl and substituted alkaryl radicals, such as tolyl, xylyl, methylnaphthyl, chlorotolyl, cyanotolyl, methoxytolyl, ethoxychlorotolyl, phenoxytolyl, chlormethyltolyl, carbomethoxytolyl, carboethoxynaphthyl, carboethoxyxylyl, carbophenoxytolyl, acetoxytolyl, benzoyloxytolyl, carbomethyltolyl, carbomethylxylyl, carbophenyltolyl, and the like; alkoxy radicals containing up to about 12 carbon atoms or more, such as methoxy, ethoxy, isopropoxy, 2-ethylhexyloxy, cyanoethoxy, chloropentyloxy, and the like; aryloxy radicals such as phenoxy, naphthoxy, chlorophenoxy, tolyloxy, xylyloxy, cyanotolyloxy, and the like; carboalkoxy radicals such as carbomethoxy, carboethoxy, carbohexyloxy, and the like; carboaryloxy radicals such as carbophenoxy, carbotolyloxy, carbochlorophenoxy, and the like; acyloxy radicals such as acetoxy, propionoxy, and the like; aroyloxy radicals such as benzoyloxy, chlorobenzoyloxy, toluyloxy, and the like; carboalkyl radicals such as carbomethyl, carbobutyl, carbochloroethyl, and the like; and carboaryl radicals such as benzoyl, toluyl, chlorotoluyl, and the like.

Among the divalent radicals which X can represent there may be mentioned: ethylene, isopropylene, butylene, 2-ethylhexylene, octylene, 2-chlorobutylene, 3-phenylpentylene, phenylene, tolylene, chlorphenylene, 2-butenylene, 2-pentenylene, 3-hexenylene, and the like.

The unsaturated portion of the sulfone molecule:

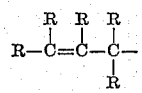

can have more than one R group representing a radical other than hydrogen. However, not more than three of the R groups should be radicals other than hydrogen. In fact, it is preferred that not more than two such substituents be present in the molecule since the more complicated the structure of the sulfone, the more difficult it is to chart the process of the reaction, and in addition, one is more apt to encounter decomposition because higher temperatures are, in general, required.

The reaction of this invention to produce olefinic compounds from the unsaturated sulfones defined above can be carried out at temperatures as low as about 175° C. Preferably the reaction is carried out at temperatures of from about 200° C. to about 400° C. at atmospheric pressure, either in a batchwise or in a continuous manner. Higher temperatures can, of course, be used where the reactants and products are not decomposed at the higher temperatures to carbonized products. It has also been found that the reaction proceeds at a lower temperature when the reaction is carried out at a reduced pressure.

A study of the reaction mechanism appears to indicate that the reaction can proceed according to two separate and distinct mechanisms. These mechanisms have been called (1) the cyclic mechanism and (2) to free radical mechanism. The cyclic mechanism appears to predominate at the lower temperatures (below about 275°) while the free radical mechanism predominates at the higher temperatures (above about 325° C.), with both mechanisms playing important roles at the intermediate temperatures.

The particular temperatures at which each mechanism will predominate in any instance is difficult to define since these temperatures will vary depending on the starting sulfone. For this reason, no attempt is made to set forth any specific temperature limits. While possible mechanisms for the course of this reaction have been set forth, the inventors do not intend to be limited thereto by their theoretical discussions since these discussions are offered solely in an attempt to explain possible routes by which the reaction can proceed and to assist others in the better understanding of the invention. For simplicity, the mechanisms possible are described more fully with mono-unsaturated mono-sulfones only for the purposes of description.

The cyclic mechanism encountered with mono-unsaturated mono-sulfones can be explained by assuming that a cyclic intermediate forms during the transition stage, and that this then eliminates sulfur dioxide with the shift of the double bond and the formation of the unsaturated compound. This can be illustrated as follows:

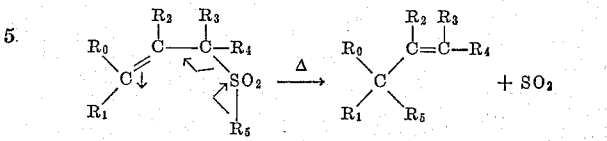

That the $R_5$ radical actually attaches itself to the carbon atom having the $R_0$ and $R_1$ radicals attached thereto has been established by a study of the reaction of ethyl 4-methylsulfonylcrotonate by the process of this invention. The product which was obtained from this reaction was ethyl 2-methyl-3-butenoate, which can be explained most logically by the cyclic mechanism as follows:

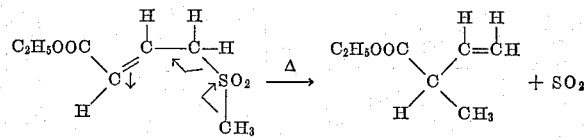

The occurrence of both cyclic and free radical mechanisms with mono-unsaturated mono-sulfones was established by the pyrolysis of allyl t-amyl sulfone. This sulfone was first pyrolyzed at 200° C. and there was obtained about a 54 percent yield of 4,4-dimethyl-1-hexene, which is the product expected if the cyclic mechanism occurs, as follows:

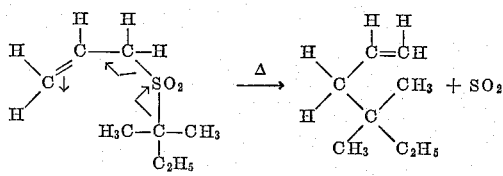

In addition to the 54 percent yield of 4,4-dimethyl-1-hexene, there was obtained a yield of about 16 percent of other products, such as propylene, 2-methyl-1-butene, 1,5-hexadiene and isopentane. However, when this same sulfone was pyrolyzed at 350° C. there was obtained only a 30 percent yield of 4,4-dimethyl-1-hexene, and about a 52 percent yield of other products as follows: a 24 percent yield of propylene, a 16 percent yield of 2-methyl-1-butene, an 8 percent yield of 1,5-hexadiene and a 4 percent yield of isopentane. The formation of these products can be most logically explained by a free radical mechanism scheme as follows:

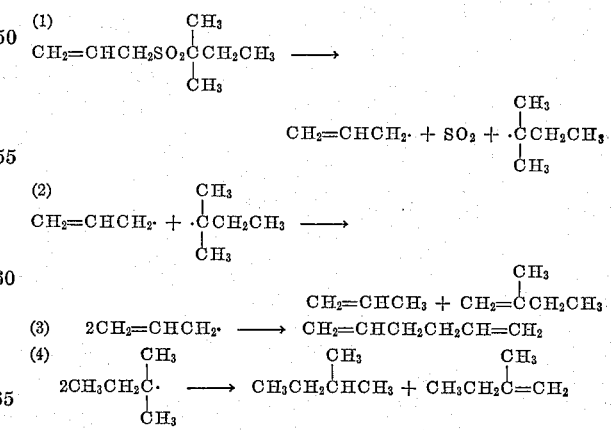

The 4,4-dimethyl-1-hexene can be formed by the recombination of the two free radicals produced in Equation 1, as indicated below in Equation 5, as well as by the cyclic mechanism previously described:

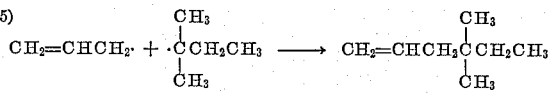

It can thus be seen that when there are no substituents other than hydrogen on the unsaturated portion of the mono-sulfone, that one can obtain the same product by both the cyclic and free radical mechanisms when the reaction is carried out at the higher temperatures.

It appears likely that in the free radical mechanism there is no shifting of the double bond in the unsaturated portion of the molecule, as appears to occur in the cyclic mechanism, but rather that the $R_5$ radical directly attaches itself to the carbon atom having the $R_3$ and $R_4$ radicals attached thereto when the sulfonyl radical is split out. This free radical mechanism can be illustrated by the following general equation; wherein the free radicals formed have recombined as illustrated above in Equation 5:

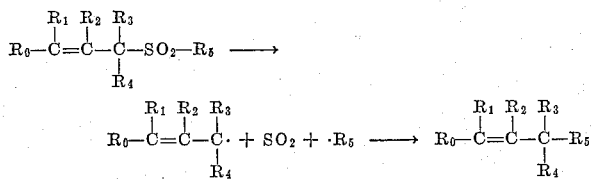

The mechanisms encountered with the di-unsaturated mono-sulfones and the unsaturated disulfones are undoubtedly similar in nature, though more complicated, and for that reason we have not gone into the same degree of description.

Illustrative of the mono-unsaturated mono-sulfones which can be used as starting materials in this invention, there may be mentioned inter alia:

allyl methyl sulfone,
allyl t-butyl sulfone,
allyl t-amyl sulfone,
allyl n-hexyl sulfone,
allyl t-hexyl sulfone,
allyl t-heptyl sulfone,
allyl t-octyl sulfone,
allyl cyclohexyl sulfone,
allyl bromobutyl sulfone,
allyl cyanohexyl sulfone,
allyl propoxyethyl sulfone,
allyl methoxycyanopentyl sulfone,
allyl phenoxybutyl sulfone,
ethyl allylsulfonylacetate,
methyl 4-allylsulfonylbutyrate,
butyl 3-allylsulfonylpropionate,
methyl 8-allylsulfonyloctanoate,
phenyl allylsulfonylacetate,
tolyl 3-allylsulfonylpropionate,
chlorophenyl 4-allylsulfonylbutyrate,
2-allylsulfonylethyl acetate,
allylsulfonylpropyl benzoate,
2-allylsulfonylethyl chlorobenzoate,
methyl allylsulfonylethyl ketone,
butyl allylsulfonylpentyl ketone,
chloropropyl allylsufonylpropyl ketone,
phenyl allylsulfonylethyl ketone,
tolyl allylsulfonylisopropyl ketone,
phenyl allylsulfonylcyanobutyl ketone,
allyl phenyl sulfone,
allyl naphthyl sulfone,
allyl biphenylyl sulfone,
allyl p-chlorophenyl sulfone,
allyl bromonaphthyl sulfone,
allyl cyanophenyl sulfone,
allyl hydroxynaphthyl sulfone,
allyl methoxyphenyl sulfone,
allyl phenoxyphenyl sulfone,
allyl tolyloxyphenyl sulfone,
methyl allylsulfonylbenzoate,
octyl allylsulfonylbenzoate,
phenyl allylsulfonylbenzoate,
chlorophenyl allylsulfonylchlorobenzoate,
tolyl allylsulfonylnaphthoate,
allylsulfonylphenyl acetate,
allylsulfonylphenyl benzoate,
methyl allylsulfonylphenyl ketone,
phenyl allylsulfonylphenyl ketone,
tolyl allylsulfonylchlorophenyl ketone,
allyl tolyl sulfone,
allyl xylyl sulfone,
allyl chlortolyl sulfone,
allyl cyanotolyl sulfone,
allyl hydroxyxylyl sulfone,
allyl methoxytolyl sulfone,
allyl ethoxychlorotolyl sulfone,
allyl phenoxytolyl sulfone,
allyl chloroethyltolyl sulfone,
methyl allylsulfonyltoluate,
phenyl allylsulfonyltoluate,
allylsulfonyltolyl propionate,
allylsulfonylxylyl benzoate,
methyl allylsulfonyltolyl ketone,
phenyl allylsulfonylxylyl ketone,
allyl benzyl sulfone,
allyl phenethyl sulfone,
allyl chlorobenzyl sulfone,
allyl 4-(dichlorophenyl)-butyl sulfone,
allyl cyanophenethyl sulfone,
allyl hydroxyphenethyl sulfone,
allyl methoxybenzyl sulfone,
allyl phenoxybenzyl sulfone,
allyl dimethylbenzyl sulfone,
allyl phenylbenzyl sulfone,
methylallylsulfonylmethylbenzoate,
phenyl allylsulfonylmethylbenzoate,
allylsulfonylmethylphenyl acetate,
allylsulfonylmethylphenyl benzoate,
methyl allylsulfonylmethylphenyl ketone,
phenyl allylsulfonylmethyltolyl ketone,
ethyl crotylsulfonylacetate,
ethyl 4-crotylsulfonylbutyrate,
methyl crotylsulfonyl-t-octoate,
tolyl crotylsulfonylacetate,
bromophenyl 4-crotylsulfonylbutyrate,
2-crotylsulfonylethyl acetate,
methyl crotylsulfonylphenyl ketone,
phenyl crotylsulfonylethyl ketone,
crotyl dichlorophenyl sulfone,
crotylsulfonylphenyl acetate,
methyl crotylsulfonyltolyl ketone,
crotyl cyanotolyl sulfone,
crotyl bromotolyl sulfone,
phenyl crotylsulfonyltoluate,
crotylsulfonyltolyl acetate,
crotylsulfonyltolyl benzoate,
phenyl crotylsulfonyltolyl ketone,
crotyl chlorophenethyl sulfone,
crotyl tolyloxybenzyl sulfone,
crotyl propylbenzyl sulfone,
crotyl methyl sulfone,
crotyl propyl sulfone,
crotyl chloropropyl sulfone,
crotyl n-hexyl sulfone,
crotyl t-octyl sulfone,
crotyl cyclohexyl sulfone,
crotyl cyanoheptyl sulfone,
crotyl propoxybutyl sulfone,
crotyl phenoxypentyl sulfone,
crotyl tolyloxypropyl sulfone,
methyl 3-crotylsulfonylpropionate,
phenyl 4-crotylsulfonylbutyrate,
crotylsulfonylpropyl acetate,
crotylsulfonylethyl benzoate,
ethyl crotylsulfonylpropyl ketone,
tolyl crotylsulfonylethyl ketone,
crotyl phenyl sulfone,
crotyl cyanophenyl sulfone,
crotyl ethoxyphenyl sulfone,
crotyl phenoxyphenyl sulfone,
methyl crotylsulfonylbenzoate, phenyl crotylsulfonylbenzoate,
crotylsulfonylphenyl propionate,
crotylsulfonylphenyl benzoate,
ethyl crotylsulfonylphenyl ketone,
phenyl crotylsulfonylphenyl ketone,
crotyl tolyl sulfone,
crotyl hydroxytolyl sulfone,
crotyl propoxytolyl sulfone,
crotyl phenoxytolyl sulfone,
ethyl crotylsulfonyltoluate,
crotylsulfonyltolyl butyrate,
crotylsulfonylxylyl benzoate,
ethyl crotylsulfonyltolyl ketone,
naphthyl crotylsulfonyltolyl ketone,
crotyl benzyl sulfone,
crotyl hydroxyphenethyl sulfone,
crotyl methoxybenzyl sulfone,
crotyl methylbenzyl sulfone,
crotyl phenylbenzyl sulfone,
crotyl phenoxybenzyl sulfone,
ethyl crotylsulfonylmethylbenzoate,
phenyl crotylsulfonylethylbenzoate,
crotylsulfonylethylphenyl acetate,
crotylsulfonylmethylphenyl benzoate,
methyl crotylsulfonylethylphenyl ketone,
phenyl crotylsulfonylethylphenyl ketone,
tolyl crotylsulfonylethylphenyl ketone,
2-chloroallyl bromonaphthyl sulfone,
2-methylallyl t-butyl sulfone,
2-chloroallyl n-hexyl sulfone,
2-methylallyl cyclohexyl sulfone,
2-cyanoallyl methyl sulfone (2-methylsulfonylmethylacrylonitrile),
2-methoxyallyl phenoxy butyl sulfone,
2-carbomethoxyallyl propyl sulfone,
2-acetoxyallyl octyl sulfone,
2-carbophenoxyallyl phenyl sulfone,
2-(2-chloroallylsulfonyl)ethyl acetate,
methyl(2-chloroallyl)sulfonylethyl ketone,
(2-cyanoallyl)sulfonylpropyl benzoate,
2-(2-cyanoethoxy)allyl phenyl sulfone,
2-chloroallylsulfonylphenyl acetate,
propyl(2-methoxyallyl)sulfonylphenyl ketone,
2-butoxyallyl tolyl sulfone,
methyl 2-propoxyallylsulfonyltoluate,
phenyl 2-carbomethoxyallylsulfonyltoluate,
2-carbobutoxyallylsulfonyltolyl propionate,
butyl 2-chloroallylsulfonyltolyl ketone,
2-(2-chloroethoxy)allylsulfonyl benzyl ketone,
2-chloro-2-pentenyl methyl sulfone,
2-cyano-3-methoxyallyl phenyl sulfone,
methyl 2-chloroallylsulfonylmethylbenzoate,
2-ethoxyallylsulfonylbenzophenone,
2,3-dichloroallyl ethyl sulfone,
2-(3-chloroallylsulfonyl)ethyl acetate,
3-ethoxyallyl phenoxybutyl sulfone,
3-phenylallyl ethyl sulfone (cinnamyl ethyl sulfone),
methyl 2-(3-chloroallylsulfonyl)ethyl ketone,
(3-cyanoallyl)sulfonylpropyl benzoate,
3-chlorocrotylsulfonylpropyl acetate,
2-chlorocrotyl ethyl sulfone,
2-cyanocrotyl cyclopentyl sulfone,
ethyl 2-chlorocrotylsulfonylacetate,
ethyl 4-methylsulfonyl-2-pentenoate,
methyl 5-ethylsulfonyl-4-chloro-3-hexenoate,
3-methoxycrotyl phenyl sulfone,
2-(2-pentenylsulfonyl)ethyl benzoate,
methyl 3-cyanocrotylsulfonylpropyl ketone,
3-chlorocrotyl ethoxyphenyl sulfone,
4-methoxycrotylsulfonylphenyl acetate,
3-carbomethylcrotyl tolyl sulfone,
4-carboethoxycrotylsulfonyltolyl acetate,
methyl 2-cyano-crotylsulfonyl acetate,
propyl 3-methylcrotylsulfonylmethylphenyl ketone,
ethyl 4-methylsulfonylcrotonate,
3-cyanocrotyl propoxybutyl sulfone,
methyl 3-(4-methoxycrotylsulfonyl)propionate,
2-methylcrotyl propyl sulfone,
2-methylcrotyl t-heptyl sulfone,
phenyl 4-(3-carbomethoxycrotylsulfonyl)butyrate,
(2-ethoxycrotyl)sulfonylpropyl acetate,
methyl (4-ethyl-2-hexenylsulfonyl)propyl ketone,
2-chlorocrotyl ethoxyphenyl sulfone,
methyl 2-chlorocrotylsulfonylbenzoate,
(3-cyanocrotylsulfonyl)phenyl propionate,
(4-carbomethylcrotylsulfonyl)phenyl benzoate,
2-acetoxycrotyl tolyl sulfone,
propyl (3-cyanocrotylsulfonyl)benzoate,
ethyl (3-methyl-2-pentenylsulfonyl)tolyl ketone,
2-cyanocrotyl benzyl sulfone,
4-ethyl-2-hexenyl methoxybenzyl sulfone,
2-acetoxycrotyl benzyl sulfone,
ethyl(2-carbomethyl)crotylsulfonylmethylbenzoate,
(3-cyanocrotylsulfonylethyl)phenyl acetate,
1-penten-3-yl methyl sulfone,
3-penten-2-yl butyl sulfone,
4-hexen-3-yl chlorohexyl sulfone,
1-hexen-3-yl phenoxybutyl sulfone,
2-methyl-3-penten-2-yl tolyl sulfone,
4-hepten-3-yl phenyl sulfone,
2-hepten-4-yl chlorophenyl sulfone,
4-methylene-3-hexyl cyanopropyl sulfone,
4-ethyl-4-methyl-1-hexen-3-yl benzyl sulfone, and the like.

Illustrative di-unsaturated mono-sulfones, which can be used as starting materials in this invention, there may be mentioned inter alia:

diallyl sulfone,
dimethallyl sulfone,
allyl methallyl sulfone,
bis-2-(chloroallyl) sulfone,
bis-2-(cyanoallyl) sulfone,
allyl cyanoallyl sulfone,
allyl 2-chloroallyl sulfone,
bis-2-(methoxyallyl) sulfone,
dimethyl 4,4'-sulfonyldicrotonate,
3,3'-sulfonyldipropenyl diacetate,
bis-(3-carbomethylallyl) sulfone,
allyl 3-carbomethylallyl sulfone, and the like.

Illustrative unsaturated disulfones, which can be used as starting materials in this invention, there may be mentioned, inter alia:

1,4-bis-(allylsulfonyl)butane,
1,4-bis-(allylsulfonyl)benzene,
1,4-bis-(allylsulfonylmethyl)benzene,
1,2-bis-(methallylsulfonyl)ethane,
1,6-bis-(allylsulfonyl)-2-ethylhexane,
1,4-bis-(2-chloroallylsulfonyl)-2-chlorobutane,
1,3-bis-(cyanoallylsulfonyl)propane,
1,4-bis-(2-methoxyallylsulfonyl)butane,
1,5-bis-(crotylsulfonyl)pentane,
1,3-bis-(3-acetoxyallylsulfonyl)propane,
dimethyl 4,4'-tetramethylenedisulfonyldicrotonate,
1,5-bis-(cyanoallylsulfonyl)-3-phenylpentane,
1-allylsulfonyl-4-ethylsulfonyl-2-butene,
5-allylsulfonyl-1-propylsulfonyl-2-pentene,
1,4-bis-(allylsulfonyl)-2-butene,
1,6-bis-(2-cyanocrotylsulfonyl)-2-hexene,
1-allylsulfonyl-4-methylsulfonylbutane,
1,4-bis-(butylsulfonyl)-2-butene, and the like.

The mono-unsaturated mono-sulfones which are useful in this invention can be produced by the reaction of an unsaturated halogen compound with an organic mercaptan to form the thio derivative which can then be oxidized to the sulfone, for example, with peracetic acid. In a typical reaction, 2,3-dichloropropene was reacted with 2-mercaptoethanol to produce 2-chloroallylthioethanol, which was then oxidized and acetylated to 2-(2-chloroallylsulfonyl)ethyl acetate, as illustrated by the following equations:

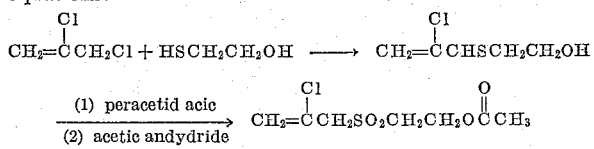

The unsaturated products produced from the pyrolysis of the sulfones by the processes of this invention are quite varied, and depend upon the starting sulfone. It has been found that quite often the reaction produces a mixture of products, as has hereinbefore been indicated, and that the products so produced can be separated from one another by the conventional procedures such as distillation and the like.

By the process of this invention one can produce alkenes and substituted alkenes from the unsaturated sulfones represented by the general formulae:

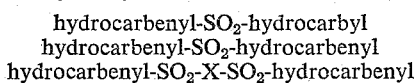

and from substituted derivatives thereof, i.e., unsaturated sulfones wherein the hydrocarbenyl or hydrocarbyl groups have substituents other than hydrogen attached to one or more of the carbon atoms therein. The term "hydrocarbenyl" is used to represent a monovalent unsaturated unsubstituted or substituted allyl radical as has hereinbefore been shown by the symbol R" and as represented by the formula:

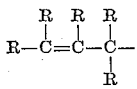

whereas the term "hydrocarbyl" is used to represent a mono-valent saturated unsubstituted or substituted hydrocarbon radical as has hereinbefore been shown as represented by the symbol R', as is hereinafter further shown. For example, 1-butene can be produced from allyl methyl sulfone and 2-ethylacrylonitrile can be produced from 2-methylsulfonyl-methylacrylonitrile; or 1,5-hexadiene can be produced from diallyl sulfone; and 1,9-decadiene can be produced from 1,4-di(allylsulfonyl)butane. Ethers can be readily produced when either of the hydrocarbyl radicals has alkoxy or aryloxy radicals, including such radicals with substituents thereon, attached to one or more of the carbon atoms thereof; for example, methyl 5-hexen-2-yl ether from allyl 2-methoxypropyl sulfone. Where either hydrocarbyl radical contains a carbonyl ketone radical, the products produced are unsaturated ketones; for example, methyl 4-pentenyl ketone from methyl allylsulfonylethyl ketone and methyl pentenyl ketones from methyl ethylsulfonylpropenyl ketone. In similar manner, when either of the hydrocarbyl radicals contains an esterified carboxyl radical or an esterified hydroxyl radical as a substituent on one or more of the carbon atoms, then one produces an ester; for example, methyl 6-heptenoate from methyl 4-allylsulfonylbutyrate, 4-penten-1-yl acetate from 2-allylsulfonylethyl acetate, 2-methyl-3-butenoate from ethyl 4-methylsulfonylcrotonate and 2-ethyl-3-butenyl acetate from ethylsulfonylcrotyl acetate. Also, the esters so produced can be hydrolyzed to produce the unsaturated acid or alcohol; for example, 6-heptenoic acid from methyl 6-heptenoate and 4-penten-1-ol from 4-pentenyl acetate. It is to be understood that when the terms alkene, olefin, ether, alcohol, ester, ketone or acid are employed anywhere herein, that the terms also include the substituted compounds as well as the unsubstituted compounds.

Among the unsaturated products which can be produced by the process of this invention are 1-butene from allyl methyl sulfone; allyl benzene from allyl phenyl sulfone at temperatures above about 350° C. at atmospheric pressure; 4-phenyl-1-butene from allyl benzyl sulfone; 1-nonene from allyl n-hexyl sulfone; 1-allyl-4-chlorobenzene from allyl p-chlorophenyl sulfone at temperatures above about 350° C. at atmospheric pressure; o-allyltoluene from allyl o-tolyl sulfone at temperatures above about 350° C. at atmospheric pressure; 4,4-dimethyl-1-hexene, 2-methyl-1-butene, propylene and 1,5-hexadiene from allyl t-amyl sulfone; propylene, 1,5-hexadiene, 2-methyl-1-pentene and a mixture of terminally unsaturated nonenes which was predominantly 4,4-dimethyl-1-heptene from allyl t-hexyl sulfone; 4,4-dimethyl-1-octene as the predominant product from allyl t-heptyl sulfone; 4,4-dimethyl-1-nonene as the predominant product from allyl t-octyl sulfone; 2-chloro-1-nonene from 2-chloroallyl n-hexyl sulfone; 5-phenyl-2-pentene from 3-buten-2-yl benzyl sulfone; 2,4,4-trimethyl-1-pentene from methallyl t-butyl sulfone; 4,4-dimethyl-1-pentene from allyl t-butyl sulfone; ethyl 4-pentenoate from ethyl allylsulfonyl acetate; methyl 6-heptenoate from methyl 4-allylsulfonyl butyrate; 4-chloro-4-pentenyl acetate from 2-(2-chloroallylsulfonyl)ethyl acetate; 4-pentenyl acetate from 2-allylsulfonylethyl acetate; 3-methyl-1-hexene and a mixture of an octadiene, an undecadiene and a decene from crotyl propyl sulfone; 3-methyl-4-phenyl-1-butene from crotyl benzyl sulfone; ethyl 2-methyl-3-butenoate from ethyl 4-methylsulfonylcrotonate; 2-ethylacrylonitrile from 2-methylsulfonylmethylacrylonitrile; and the like.

Illustrative of di-unsaturated products which can be produced by the process of this invention are 1,5-hexadiene from diallyl sulfone; 2,5-dimethyl-1,5-hexadiene from dimethallyl sulfone; 2-cyano-1,5-hexadiene from allyl cyanoallyl sulfone; the dimethyl ether of 1,5-hexadiene-2,5-diol from bis-(2-methoxyallyl) sulfone; dimethyl octadienedioate from dimethyl 4,4'-sulfonyldicrotonate; 1,9-decadiene from 1,4-bis(allylsulfonyl)butane; 1,4-diallyl benzene from 1,4-bis(allylsulfonyl)benzene; 2,8-dicyano-2,7-nonadiene from 1,3-bis(cyanoallylsulfonyl)propane; dimethyl decadienedicarboxylate from dimethyl 4,4'-tetramethylenedisulfonyldicrotonate, and the like.

It has also been found that alkyl aralkyl sulfones wherein the ring unsaturation is two carbon atoms removed from the sulfonyl radical also undergo the reaction of this invention. Thus, ethylbenzene can be produced from benzyl methyl sulfone and isobutylbenzene can be produced by pyrolysis of benzyl isopropyl sulfone by procedures substantially the same as those herein described.

The reaction can be carried out in bulk, that is, in the absence of solvents, at atmospheric pressure, or under a slight pressure, or under a vacuum, by heating the unsaturated sulfone at a temperature above about 175° C. The products produced and the sulfur dioxide liberated are distilled over and collected in a suitably cooled receiver. The distillate is then fractionally separated by distillation, fractional crystallization, or other suitable means. The bulk reaction can be carried out in a batchwise manner, by heating a fixed quantity of the starting material in the reaction vessel; or in a continuous manner, by continually feeding the starting sulfone through a heated converter, for example, a tubular converter, which can be either unpacked or packed with an inert solid material. Suitable packing materials are glass beads, fibers, or rings; metal beads, fibers, or rings; ceramic, siliceous, or asbestos shaped forms; and the like inert heat resistant materials.

One can also carry out the reaction in the presence of an inert organic solvent; that is, a solvent which will not interfere with the reaction or participate in it. This procedure can also be carried out by the batch method or by the continuous process.

One such group of solvents is the aromatic solvents in which benzene and the alkyl substituted benzenes are found. This group includes benzene, toluene, xylene, chlorobenzene, ethylbenzene, and other similar aromatic liquids.

Another group of solvents which can be employed is the normally liquid saturated hydrocarbons, including the straight and branched chain, cyclic, and alkyl substituted cyclic saturated hydrocarbons. Such diluents are exemplified by pentane, hexane, 3-methylpentane, 2,2-dimethylbutane, heptane, octane, cyclohexane, methylcyclohexane, decahydronaphthalene, and other similar saturated aliphatic and cycloaliphatic liquids. In addition, lower fatty acids such as acetic acid or propionic acid have also been found satisfactory.

The pyrolysis of the unsaturated sulfones can produce a mixture of products, as hereinbefore indicated. This mixture is collected in a suitable receiver, and the components thereof are then separated from one another by procedures which are well known.

In the batch process, distillation equipment including a distilling flask, distilling head, condenser, receiver, Dry Ice cold trap and vacuum line and pump can be used. The temperature of the reaction mixture is maintained at above about 175° C., preferably between about 180° C. and about 250° C. and the pressure held either at atmospheric pressure or preferably at a reduced pressure as low as about 50 millimeters to 100 millimeters of mercury or less during the reaction. The product produced, being lower boiling than the starting sulfone, and the sulfur dioxide are distilled as formed and collected in the receiver and cold trap during the pyrolysis. The product is recovered largely in the receiver and the sulfur dioxide mostly in the cold trap; except in such cases wherein the product is a low boiling alkene, such as 1-butene, then the product is also found in large quantities in the cold trap. The sulfur dioxide can be evaporated off and the product, from the receiver or the cold trap, is washed with dilute base, such as sodium hydroxide, sodium carbonate, sodium bicarbonate, potassium hydroxide, etc., to remove residual contained sulfur dioxide and then distilled to give the pure unsaturated compound. There is no need to use a catalyst; however, the presence of acids or bases, or their salts, does not seem to interfere with the reaction.

The continuous process can be conveniently carried out in the laboratory using a stainless steel tube packed with an inert material. The temperature inside the tube is maintained above about 200° C., preferably above about 300° C., and the sulfone is passed through at atmospheric or preferably at reduced pressure at a rate which varies, depending upon the size of the tube. A good rate for a one-inch tube forty-two inches long is from about 60 to about 120 milliliters of reaction mixture per hour. The effluent is collected in a cooled receiver which is in turn connected to a cold trap to condense highly volatile fractions. The product is then separated as described above in the description of the batch process.

The unsaturated hydrocarbons which can be produced by the processes of this invention are suitable monomers for the production of polymers and copolymers. The polymers can be produced by contacting the monomer, or a mixture thereof, with the Ziegler catalyst complex. This catalyst complex comprises a halide, or a mixture thereof, of a transition metal of Groups IVB, VB, and VIB of the Periodic Table of the Elements, such as titanium, zirconium, vanadium, chromimum, or tungtsen, and an organo metallic compound or metal hydride of the elements of Groups IA, IIA, and IIIA of the Periodic Table of the Elements, such as lithium, beryllium, magnesium, or aluminum. As is well known, this polymerization can be carried out in the presence of an inert hydrocarbon solvent, such as heptane, toluene, cyclohexane, etc., at tempertaures ranging from about 0° C. or less to about 200° C. or higher. Among some of the organo metallic compounds which can be used there may be mentioned, for example, triisobutylaluminum, diethylaluminum chloride, monoisobutylaluminum hydride, dioctylaluminum hydride, didodecylberyllium, beryllium hydride, lithium hydride, phenyl lithium, dioctylmagnesium, and the like. Among some of the metallic halides there may be mentioned, illustratively, vanadium tetrachloride, vanadium trichloride, vanadyl trichloride, titanium tetrachloride, titanium trichloride, titanium dichloride, zirconium tetrachloride, chromium trichloride, titanium tetrafluoride, titanium tetrabromide, tungsten hexachloride, and similar halides of the transition metals of Groups IVB, VB, and VIB of the Periodic Table of the Elements. The polymers so produced can be used to prepare films, filaments, molded articles, coatings, and the like.

The unsaturated esters produced by the processes of this invention can be used to produce the corresponding alochols and/or acids by hydrolysis; and they can be used as solvents or plasticizers. The unsaturated ketones and alcohols, which can be produced directly or by hydrolysis of the corresponding ester, can be used as solvents. In addition, the unsaturated compounds produced by these processes can be used as starting materials in those reactions wherein a double bond reacts, for example, halogenation, hydrohalogenation, reduction of the double bond to the saturated compound, the addition of mercaptans, or oxidation of the double bond to the glycol, aldehyde or acid, or they can be reacted with sulfuric acid to produce sulfates useful as emulsifying agents.

The following examples further serve to illustrate the invention. Unless otherwise indicated, parts are by weight.

*Example 1*

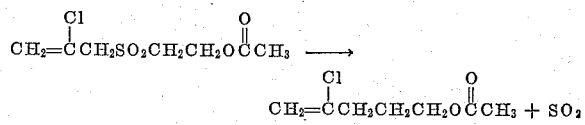

Distillation equipment, including a distilling flask, distilling head, condenser, receiver, Dry Ice cold trap, and vacuum line and pump were used. To the distilling flask there was added 550 grams (2.43 moles) of 2-(2-chloroallylsulfonyl)-ethyl acetate and 6 grams of sodium acetate. The pressure in the system was reduced to 100 millimeters and the temperature in the distilling flask was raised to 175° C. After several hours of heating at 175° C. to 190° C./100 millimeters, 332 grams of distillate was collected in the receiver and 20 grams was collected in the Dry Ice cold trap. There was 114 grams of residue in the distilling flask. The distillates from the receiver and trap were combined and distilled in a Claison-type flask, the material boiling at 75° C. to 85° C./10 millimeters being collected (weight 253 grams, 64 percent yield, $n$ 30/D 1.4410–1.4420). This distillate in turn was fractionally distilled to give 221 grams (56 percent yield) of 4-chloro-4-pentenyl acetate having a boiling point of 74.0–74.5° C./10 millimeters and a refractive index ($n$ 30/D) of 1.4410–1.4413. This was further identified by:

*Elemental analysis.*—Found: C, 51.8 percent; H, 7.0 percent; Cl, 21.6 percent. Calculated for $C_7H_{11}O_2Cl$: C, 51.7 percent; H, 6.77 percent; Cl, 21.85 percent. Saponification equivalent.—Found: 158; calculated: 162.5. Infrared spectroscopy.—Found: $CH_2=$ at 3.23 microns; ester $C=O$ at 5.75 microns; $C=C$ at 6.10 microns; ester $C—O—C$ at 8.1 and 9.6 microns;

at 11.3 microns; and chlorine at 15.8 microns. Further analysis of the product showed the absence of sulfur.

*Example 2*

A. Example 1 was essentially duplicated except that the sodium acetate was omitted. During the several hours heating period, 244 grams of distillate was collected in the receiver and 76 grams in the trap. A 120 gram residue remained in the flask. The distillates from the receiver and trap were combined and fractionally distilled to yield 105 grams (27 percent yield) of 4-chloro-4-pentenyl acetate having a boiling point of 74.5° C./10 millimeters and a refractive index ($n$ 30/D) of 1.4410 to 1.4418.

B. The products from Examples 1 and 2 were combined and again fractionally distilled to yield 200 grams of 4-chloro-4-pentenyl acetate having a boiling point of 74° C./10 millimeters and a refractive index ($n$ 30/D) of 1.4410. A sample of the acetate ester was hydrolyzed with methanol and sulfuric acid to yield the corresponding alcohol. The alcohol had a boiling point of 72.5° C./10 millimeters and a refractive index ($n$ 30/D) of 1.4604–1.4605. Infrared spectroscopy of the 4-chloro-4-penten-1-ol showed: OH at 3.05 microns;

at 11.35 microns and 5.65 microns; C=C at 6.13 microns; primary OH at 9.5 microns; chlorine at 14.4 microns. Chlorine analysis.—Found: 29.2 percent; calculated, 29.45 percent.

*Example 3*

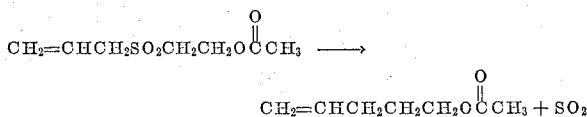

A. To a distilling flask which was equipped in the same manner as described in Example 1, there were placed 354 grams (1.85 moles) of 2-allylsulfonylethyl acetate and 1 gram of sodium acetate. The pressure was reduced to 100 millimeters and the temperature in the flask was raised to 175° C. Heating was continued for several hours as the temperature slowly rose to 235° C. During the heating period 125 grams of distillate was collected in the receiver and 41 grams in the trap. The trap material smelled strongly of sulfur dioxide. The sulfur dioxide was allowed to volatilize from the trap fraction, and the residue was combined with the receiver distillate, and the mixture was fractionally distilled. There was obtained 39 grams (16 percent yield) of 4-pentenyl acetate having a boiling point of 72.5° C./50 millimeters and a refractive index ($n$ 30/D) of 1.4129–1.4130. The product was further identified by:

*Elemental analysis.*—Found: C, 64.8 percent; H, 9.3 percent. Calculated for $C_7H_{12}O_2$: C, 65.7 percent; H, 9.37 percent. Infrared spectroscopy.—Found $CH_2=$ at 3.25 microns; ester C=O at 5.74 microns; and acetate C—O at 8.08 and 9.6 microns.

B. A portion of the above 4-penten-1-yl acetate was hydrolyzed in methanol and sulfuric acid to produce the corresponding alcohol. The alcohol, 4-penten-1-ol, had a boiling point of 54.5° C./20 millimeters and a refractive index ($n$ 30/D) of 1.4251–1.4253.

*Elemental analysis.*—Found: C, 68.7 percent; H, 11.6 percent. Calculated for $C_5H_{10}O$: C, 69.8 percent; H, 11.6 percent.

*Example 4*

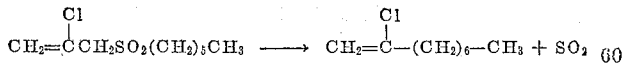

To a flask equipped in the same manner as described in Example 1 there were added 275 grams (1.22 moles) of 2-chloro-allyl n-hexyl sulfone and 1 gram of sodium acetate. The pressure was reduced to 100 millimeters and the flask heated as described in Example 3 at 175° C. to 200° C. for fourteen hours, and the distillate similarly collected. After fractional distillation of the distillate, 128 grams (65 percent yield) of 2-chloro-1-nonene having a boiling point of 79° C./20 millimeters and a refractive index ($n$ 30/D) of 1.4355–1.4357 was obtained.

The product, 2-chloro-1-nonene, was at least 99 percent pure, and was identified by several analytical techniques.

*Elemental analysis.*—Found: C, 65.3 percent; H, 10.7 percent; Cl, 22.1 percent. Calculated for $C_9H_{17}Cl$: C, 67.3 percent; H, 10.6 percent; Cl, 22.1 percent. Infrared analysis.—$CH_2=$ at 3.22 microns; C=C at 6.12 microns; $CH_3$— at 7.25 microns;

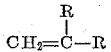

at 11.4 microns; $(CH_2)_{4+n}$ rocking at 13.78 microns; chlorine at 15.6 microns.

*Example 5*

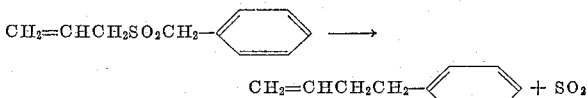

The equipment used in this example was similar to that described in Example 1. To the distilling flask there was added 196 grams (1.0 mole) of allyl benzyl sulfone, the pressure was then reduced to 50 millimeters, and the temperature of the sulfone was raised to 200° C. The reaction temperature was maintained at 200° C. to 215° C. for about twelve hours, during which a total of 87 grams of distillate was collected. This distillate was washed three times with a 5 percent aqueous sodium hydroxide solution and filtered prior to a fractional distillation. Upon distillation there was obtained 46 grams (35 percent yield) of 4-phenyl-1-butene having a boiling point of 73.5° C./20 millimeters and a refractive index ($n$ 30/D) of 1.5020–1.5021.

*Elemental analysis.*—Found: C, 90.8 percent; H, 9.4 percent. Calculated for $C_{10}H_{12}$: C, 90.9 percent; H, 9.1 percent. Mass spectroscopy further substantiated the structure of the 4-phenyl-1-butene.

*Example 6*

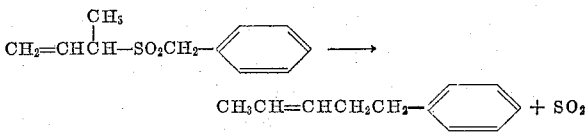

To a distilling flask equipped as described in Example 1, there was added 193 grams (0.96 mole) of 3-benzyl-sulfonyl-1-butene. The pressure on the system was reduced to 50 millimeters and the temperature of the sulfone in the reaction flask was raised to 210° C. Heating was continued for another five hours, during which time 85 grams of distillate was collected in the receiver and 5 grams of material in the trap after the sulfur dioxide had been evaporated therefrom. The two distillates were combined, washed three times with a 5 percent sodium hydroxide solution, and fractionally distilled. There was obtained 24 grams (17 percent yield) of 5-phenyl-2-pentene having a boiling point of 64° C./5 millimeters and a refractive index ($n$ 30/D) of 1.5028 to 1.5029. The product, 5-phenyl-2-pentene, was identified by mass spectrometric and elemental analyses: Found: C, 90.2 percent; H, 9.8 percent. Calculated for $C_{11}H_{14}$: 90.4 percent C; 9.6 percent H.

*Example 7*

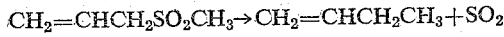

The equipment used consisted of a distilling flask, distilling head, condenser, receiver, and a Dry Ice cold trap. There was added to the flask 200 grams (1.67 moles) of allyl methyl sulfone and heating was begun. The sulfone in the reaction flask was heated at 200° C. at atmospheric pressure for six hours, during which time 70 grams of distillate was collected in the cold trap. The following procedure was then used to separate the 1-butene from sulfur dioxide. A reaction flask equipped with a stirrer, thermometer, condenser connected to a cold trap, and an inlet tube was charged with 800 grams of a 10 percent aqueous solution of sodium hydroxide. The 1-butene sulfur dioxide distillate obtained above was distilled into the reaction flask via the inlet tube, which dipped beneath the surface of the caustic solution, thus scrubbing out the sulfur dioxide and allowing the 1-butene to pass through into the cold trap. A sample of the 1-butene thus obtained analyzed as 99.7 percent pure by mass spectrometry.

*Example 8*

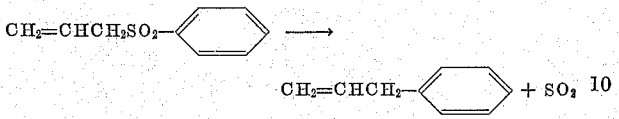

A one inch by forty-two inches Dowtherm jacketed, stainless steel pyrolysis tube was equipped with a dropping funnel at the top, a thermocouple well in the center, and an outlet at the bottom leading through a condenser and receiver to a Dry Ice cold trap. The tube was filled with 500 cubic centimeters (dry measure) of four by eight mesh Filtros, which is an inert sintered glass and silica mixture. Allyl phenyl sulfone, 274 grams (1.52 moles), was passed through the tube at an average rate of about 60 milliliters an hour at a tube temperature of about 380° C. to 398° C. The effluent material weighed 244 grams, about 41 grams of which was sulfur dioxide, and which was allowed to evaporate. The remainder of the material was distilled under reduced pressure, washed with a dilute sodium hydroxide solution, and finally fractionally distilled to yield 10 grams (5.6 percent yield) of allylbenzene having a boiling point of 56.5° C. to 57.5° C./20 millimeters and a refractive index ($n$ 30/D) of 1.5066 to 1.5068. The structure was further confirmed by infrared by comparison with the infrared spectrum of an authentic sample.

*Example 9*

$$CH_2=CHCH_2SO_2(CH_2)_3COOCH_3 \rightarrow$$
$$CH_2=CH(CH_2)_4COOCH_3+SO_2$$

The equipment used in this example was the same as that described in Example 8, with the tube packed with fresh Filtros. A total of 453 grams (2.2 moles) of methyl 4-allyl-sulfonylbutyrate was passed through the tube at an average rate of 120 milliliters an hour while the tube temperature was maintained between 370° C. and 381° C. The combined effluent from the receiver and cold trap weighed 391 grams. The sulfur dioxide, constituting 35 grams, was allowed to evaporate. The remainder of the material was distilled from a Claisen-type flask to yield a 105 gram fraction of material boiling at 40° C. to 100° C./100 millimeters and a 125 gram fraction of material boiling at 120° C. to 150° C./<1 millimeter (refractive index [$n$ 30/D] 1.4730). There was 35 grams of material collected in the cold trap during this distillation, and a 19 gram residue was left in the distilling flask. The above two fractions and the trap material were combined and again fractionally distilled. There was obtained a 29 gram fraction of methyl 6-heptenoate (9 percent yield) boiling at 60° C. to 61° C./10 millimeters and having a refractive index ($n$ 30/D) of 1.4220 to 1.4225. This fraction was further identified as methyl 6-heptenoate by saponification equivalent.—Found: 139.5; calculated: 142, and infrared analysis—found: CH$_2$= at 3.24 microns; ester C=O at 5.78 microns; ester C—O—C at 8.55 microns; vinyl at 10.98 microns.

*Example 10*

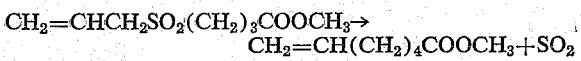

A. The equipment used at the start of this example was the same as that described in Example 8, with the tube packed with fresh Filtros. A portion (60 milliliters) of the total weight of allyl p-chlorophenyl sulfone, 650 grams (3 moles) was fed to the tube, which was maintained at a temperature of 360 to 384° C. During the reaction the tube plugged and it was, therefore, allowed to cool, cleaned, and repacked with Filtros. The remaining allyl p-chlorophenyl sulfone was diluted to 1000 milliliters with benzene, and this solution was fed to the tube, again at 360 to 381° C. After feeding 110 milliliters of the benzene solution, the tube plugged again. The tube was cooled, cleaned, and repacked with Filtros, and an attempt to pyrolyze the remainder of the sulfone at 290° C. was not successful because of plugging after 175 milliliters of the solution was fed. The receiver materials recovered from the above reactions were set aside for subsequent distillation.

B. The remainder of the above benzene solution containing the allyl p-chlorophenyl sulfone was concentrated until essentially only the sulfone remained and the sulfone was placed in a distilling flask which was equipped in a manner similar to that described in Example 1. The pressure was reduced to 50 millimeters and the sulfone was heated to 220 to 230° C. After maintaining this temperature for five hours, 113 grams of distillate was collected (boiling point up to 100° C./50 millimeters) in the receiver in addition to 32 grams of trap material. The residue in the distilling flask weighed 250 grams. The trap materials, and the receiver materials from the tube runs and from the batch-wise cracking, were combined and distilled to yield a 210 gram fraction of material having a boiling point of 40° C. to 70° C./225 millimeters and a 97 gram fraction of material having a boiling point of 70° C. to 120° C./5 millimeters. There remained 101 grams of residue from this fractionation. The above distillate fractions were combined, washed two times with 0.5 N sodium hydroxide solution and again fractionally distilled. One fraction (9 grams) boiling at 65° C. to 85° C. at 2 to 3 millimeters and having a refractive index ($n$ 30/D) of 1.5460 was identified by mass spectrometry as 1-allyl-4-chlorobenzene.

*Example 11*

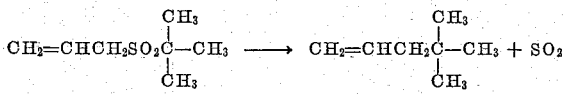

The tube described in Example 8 was packed with fresh Filtros and heated to 370° C. A total of 251 grams (1.55 moles) of allyl t-butyl sulfone was passed through the tube at an average rate of 73 milliliters an hour while the temperature of the tube was maintained at 370 to 387° C. The receiver material (86 grams) and trap material (144 grams) were combined and the sulfur dioxide (and other low boilers) was allowed to evaporate. The remainder was distilled to yield 70 grams of material with a boiling point of 70 to 75° C. at atmospheric pressure. The residue from this distillation weighed 22 grams. The above distillate was washed two times with 100 milliliter portions of 0.5 N sodium hydroxide solution and then with water. The washed distillate was then fractionally distilled to yield 19 grams (12.5 percent yield) of 4,4-dimethyl-1-pentene having a boiling point of 70.5 to 72.5° C. at atmospheric pressure and a refractive index ($n$ 30/D) of 1.3896 to 1.3900.

*Elemental analysis.*—Found: C, 85.6 percent; H, 14.4 percent. Calculated for $C_7H_{14}$: C, 85.7 percent; H, 14.3 percent.

*Example 12*

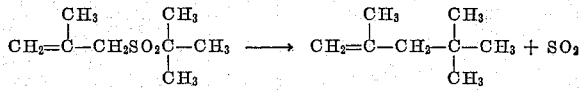

The equipment used in this example was the same as that described in Example 8, with the tube packed with fresh Filtros. The t-butyl 2-methylallyl sulfone (280 grams, 1.59 moles) was dissolved in 560 grams of ethylbenzene and passed through the tube, which was maintained at 370 to 378° C., at a rate of 190 milliliters an hour. An additional 20 grams of ethylbenzene was then passed through in order to wash out the tube. The trap material weighed 20 grams. The receiver material was placed in a distilling flask and heated to 130° C. to drive off sulfur dioxide and other low boilers. After the low boilers were removed (110 grams) the pressure was reduced to 50 millimeters and 670 grams of distillate was collected between 50 to 60° C. The residue in the flask weighed 45 grams and crystallized upon standing, indicating starting material. The distillate was washed two times with 3 percent aqueous sodium hydroxide solution and then with water, filtered, and fractionally distilled. Approximately 28 grams (16 percent yield) of 2,4,4-trimethyl-1-pentene with a boiling point of 99° C. at atmospheric pressure and a refractive index ($n$ 30/D) of 1.4046 to 1.4052, was obtained.

*Elemental analysis.*—Found: C, 85.5 percent; H, 14.6 percent. Calculated for $C_8H_{16}$: C, 85.7 percent; H, 14.3 percent.

*Example 13*

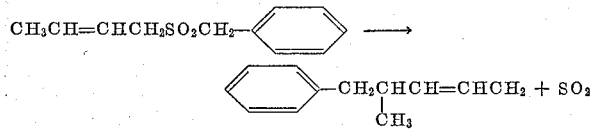

Benzyl crotyl sulfone (250 grams, 1.19 moles) was passed through the hot tube described in Example 8 (repacked with fresh Filtros). The temperature in the tube was maintained at 345 to 348° C. and passage required one and three-quarter hours. There was obtained 160 grams of material in the receiver and 15 grams in the cold trap. The receiver material was fractionally distilled giving a total of 49 grams of receiver material, 25 grams of trap material, and 73 grams of residue. This trap material was allowed to evaporate leaving 5 grams of residue. This residue and the receiver material were combined, washed two times with 150 milliliter portions of a dilute aqueous sodium hydroxide solution and fractionated. There was obtained 19 grams of material boiling at 51° C./100 millimeters and having a refractive index ($n$ 30/D) of 1.4864 to 1.4867 (identified as toluene) and 9 grams of 3-methyl-4-phenyl-1-butene with a boiling point of 51° C. to 54° C./4 millimeters and a refractive index ($n$ 30/D) of 1.4977 to 1.4984. The 3-methyl-4-phenyl-1-butene was identified by infrared and mass spectrometric analyses.

*Example 14*

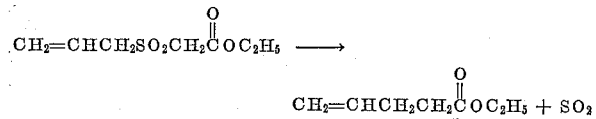

The equipment used in this example is the same as that described in Example 8, with the tube packed with fresh Filtros. A total of 600 grams (3.13 moles) of ethyl allylsulfonylacetate was passed through the tube (temperature 380 to 387° C.) at a rate of about 110 milliliters an hour. There was obtained 470 grams of material in the receiver and 79 grams of material in the trap. The receiver material was distilled and a fraction boiling from 75° C. at atmospheric pressure to 90° C./10 millimeters was collected and carefully fractionated. The redistilled fraction, weighing 95 grams (24 percent yield), had a boiling point of 68 to 69° C./50 millimeters, and a refractive index ($n$ 30/D) 1.4106 to 1.4110 was identified as ethyl 4-pentenoate.

*Elemental analysis.*—Found: C, 64.9 percent; H, 9.7 percent. Calculated for $C_7H_{12}O_2$: C, 65.7 percent; H, 9.4 percent.

Hydrolysis of the ethyl 4-pentenoate produced 4-pentenoic acid.

*Example 15*

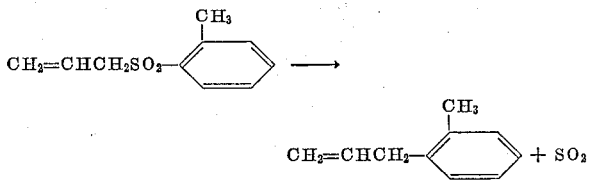

This example was conducted using the equipment described in Example 8; fresh Filtros was used to repack the tube. A total of 360 grams (1.83 moles) of allyl o-tolyl sulfone was passed through the tube (maintained at 380 to 388° C.) at a rate of about 110 milliliters an hour. Approximately 288 grams of material was collected in the receiver and 45 grams in the cold trap. The receiver material was distilled and a fraction weighing 89 grams having a boiling range of 40° C./50 millimeters to 105° C./10 millimeters was collected. This fraction and 24 grams of trap material from this distillation were combined, washed two times with 0.5 N sodium hydroxide and water, and then fractionally distilled. A 5 gram fraction having a boiling range of 64 to 66° C./10 millimeters and having a refractive index ($n$ 30/D) of 1.5138 was identified as o-allyl-toluene by infrared spectrum and mass spectrometry.

*Elemental analysis.*—Found: C, 89.9 percent; H, 9.6 percent. Calculated for $C_{10}H_{12}$: C, 90.9 percent; H, 9.1 percent.

*Example 16*

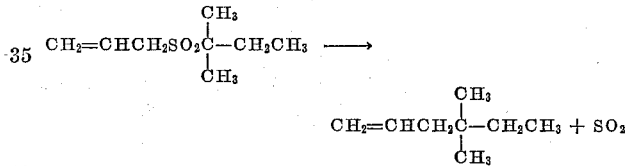

The equipment used in this example was the same as that described in Example 8; fresh Filtros was used to repack the tube. A total of 570 grams (3.24 moles) of allyl t-amyl sulfone was passed through the tube at a rate of about 110 milliliters an hour while the temperature in the tube was maintained between 382° C. to 385° C. The weight of the material recovered in the receiver was 229 grams and the weight of that in the cold trap was 310 grams. The receiver material was distilled to yield 113 grams of distillate boiling at approximately 27 to 90° C. at 100 millimeters. Thirty-four grams remained as a residue and 76 grams was collected in the cold trap from the distillation of the receiver material. The above two cold trap portions (310 grams and 76 grams) were combined and scrubbed through a dilute sodium hydroxide solution, as described in Example 7, and the effluent gas was collected in a cold trap. The above 113 grams distillate was similarly handled, and the total weight of material collected in the cold trap after scrubbing was 93 grams. The oil layer from the sodium hydroxide treatment was separated and weighed 196 grams. The two scrubbed portions from the cold trap were combined and fractionally distilled. Propylene, 2-methyl-1-butene, and 1,5-hexadiene were identified along with the product, 4,4-dimethyl-1-hexene. The latter, which weighed 50 grams (14 percent yield), had a boiling point range of 54 to 59° C. at 150 millimeters and a refractive index ($n$ 30/D) of 1.4058 to 1.4062. The 4,4-dimethyl-1-hexene was further confirmed by infrared and mass spectra analysis.

*Example 17*

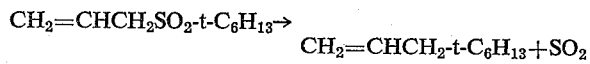

The equipment used in this example was the same as that described in Example 8; fresh Filtros was used to repack the tube. A total of 550 grams (2.9 moles) of allyl t-hexyl sulfone was passed through the tube at a rate of 115 milliliters an hour while the tube was maintained at a temperature of 376 to 387° C. The receiver material from the reaction weighed 238 grams and the cold trap material weighed 280 grams. The contents of the receiver were distilled to give 95 grams of low boiling material collected in a cold trap and 116 grams of distillate having a boiling range of about 30 to 90° C. at 100 millimeters. Both cold trap materials above (280 grams and 95 grams) were combined with the distillate (116 grams) and washed with dilute sodium hydroxide solution to yield 80 grams of low boiling material collected in a cold trap and a 226 gram oil layer. Both of these portions were again combined and fractionally distilled. Propylene, hexadiene and 2-methyl-1-pentene were identified as well as a mixture of branched terminally unsaturated nonenes. The latter mixture boiled in the range of 78 to 83° C. at 150 millimeters, had a refractive index ($n$ 30/D) of 1.4160 to 1.4192, and weighed 48 grams (13 percent yield). A substantial proportion of this fraction was 4,4-dimethyl-1-heptene as established by infrared analysis.

In Examples 18 to 23, tabulated below, the effect of temperature on the yields of the products obtained is illustrated with allyl t-amyl sulfone as the starting material. The equipment used in Examples 18 to 22 was similar to that described in Example 8, and the process employed was a continuous one. In Example 23, the batch process was employed, using equipment similar to that described in Example 1.

| Example | 18 | 19 | 20 | 21 | 22 | 23 |
|---|---|---|---|---|---|---|
| Temperature, °C | 300 | 325 | 350 | 300 | 325 | 205–250 |
| Products obtained, yield percent: | | | | | | |
| Propylene | 3.0 | 10.0 | 24 | | | 5 |
| 2-methyl-1-butene | 4.5 | 10.5 | 16 | 7.6 | 9.5 | 7 |
| 1,5-hexadiene | 1.5 | 6 | 7.7 | 3.5 | 6.0 | 0.2 |
| Isopentane | 0.8 | 0.1 | 3.6 | 0.9 | 3.6 | 3.3 |
| 4,4-dimethyl-1-hexene | 42.0 | 32.6 | 30.2 | 44.2 | 37.0 | 54 |

*Example 24*

$$CH_2=CHCH_2SO_2\text{-}t\text{-}C_7H_{15} \rightarrow$$
$$CH_2=CHCH_2\text{-}t\text{-}C_7H_{15}+SO_2$$

The equipment used in this example was similar to that described in Example 1. A total of 568 grams (2.78 moles) of allyl t-heptyl sulfone was heated in the flask at a temperature between 190 to 245° C. at 150 millimeters for approximately seven hours during which time 225 grams of trap material and 264 grams of receiver material were collected. The residue in the flask weighed 53 grams. The trap and receiver materials were combined, scrubbed through 1500 milliliters of 15 percent sodium hydroxide solution, substantially as described in Example 7 to remove the sulfur dioxide, and the resulting 307 grams of scrubbed organic material was fractionally distilled. There was obtained 97 grams of material having a boiling point of 71 to 75° C./50 millimeters and a refractive index ($n$ 30/D) of 1.4235 to 1.4250. From infrared and mass spectrometric analysis, the material proved to be a mixture of branched, terminally unsaturated ten carbon olefins, which was predominantly 4,4-dimethyl-1-octene.

*Example 25*

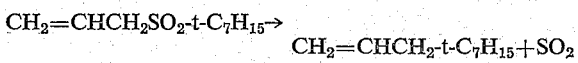

This example was conducted in a batch reaction in equipment similar to that described in Example 1. A total of 132 grams (0.92 mole) of 2-methylsulfonylmethylacrylonitrile was heated in a flask at 190 to 240° C. and 90 millimeters for about one and one-half hours. The receiver material weighed 43 grams and the trap material weighed 71 grams. The trap material was scrubbed through 1500 milliliters of 10 percent aqueous sodium bicarbonate solution as described in Example 7, and the oil layer recovered therefrom was combined with the above receiver material. The combined fractions were distilled to yield 35 grams (47 percent) of 2-ethylacrylonitrile having a boiling point of 56° C./100 millimeters and a refractive index ($n$ 30/D) of 1.4065.

*Elemental analysis.*—Found: N, 16.8 percent. Calculated for $C_5H_7N$: N, 17.3 percent.

*Example 26*

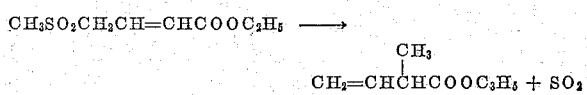

To a distilling flask which was equipped in a manner similar to that described in Example 1 there was placed 270 grams (1.4 moles) of ethyl 4-methylsulfonylcrotonate. The pressure in the system was reduced to 50 millimeters, and the temperature in the flask raised to 230° C. Heating was continued for seventeen hours, while the temperature slowly rose to 270° C. The pressure was further reduced to 10 millimeters and the kettle material was stripped free of volatiles leaving 98 grams of viscous, tarry residue. The volatile product from the reaction consisted of 108 grams of cold trap material and 25 grams of receiver material. The receiver and trap material were combined and scrubbed through 1500 milliliters of water containing 3 mols of sodium bicarbonate, substantially as described in Example 7, to remove sulfur dioxide. The sodium bicarbonate solution was extracted twice with 200 milliliter portions of ethyl ether and the extracts filtered into a 500 milliliter boiling flask. The boiling flask was attached to a still where the ether was distilled off at atmospheric pressure. The pressure in the system was reduced to 20 millimeters and 23 grams of crude product was distilled at 40 to 55° C. The crude product was then refractionated in a 20 millimeter by 4 inch packed column giving 7 grams of ethyl 2-methyl-3-butenoate boiling at 74 to 77° C. at 100 millimeters and having a refractive index of 1.4090 to 1.4096, $n$ 30/D (4 percent yield). The structure of the compound was confirmed by infrared and mass spectrometric analyses, and was further established by:

*Elemental analysis.*—Found: C, 64.6 percent; H, 9.6 percent. Calculated for $C_7H_{12}O_2$: C, 65.6 percent; H, 9.4 percent. Neutralization equivalent—found: 128; calculated: 128.

*Example 27*

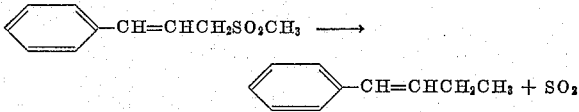

The same pyrolysis tube and equipment was used in this example as described in Example 8, but was repacked with fresh Filtros. A total of 5.6 grams (2.63 mols) of cinnamyl methyl sulfone dissolved in 2904 grams of acetic acid was passed through the tube at an average rate of 200 milliliters an hour while the temperature in the tube was maintained at 388° C. to 393° C. A total of 3340 grams of effluent was collected in the receiver and about 5 grams in the cold trap. The product in the receiver was fractionated in an efficient column, which was equipped with a Dry Ice cold trap in the vacuum line, to give 2855 grams of acetic acid, three additional fractions (96 grams) boiling between 40° C./30 millimeters and 100° C./3 millimeters, 257 grams of residue and 100 grams of trap material. The trap material was allowed to evaporate and 20 grams of material remained. A sample of the volatile portion was analyzed as 93.7 percent $SO_2$ by mass spectrometry. The three fractions boiling above acetic acid were combined (96 grams) and washed once with sufficient 10 percent NaOH solution to bring the pH to about 8.0 and once more with distilled water only. Fifty-seven grams of oil layer from the washing was fractionated in a short packed column to give 25 grams of a mixture of allylbenzene and 1-phenyl-1-butene boiling at 59° C. to 69° C. at 10 millimeters pressure as identified by infrared and mass spectrometric analyses after separation.

*Example 28*

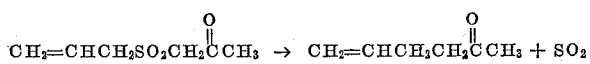

To a distillation flask which was equipped in a manner similar to that described in Example 1 there was placed 324 grams (2 moles) of 1-allylsulfonyl-2-propanone. The flask was then heated at 200° C. to 207° C./100 millimeters pressure for seven hours and at 220° C. to 240° C./200 millimeters pressure for another seven hours. During the first seven hour period 64 grams of receiver material was collected and during the second seven hour period 68 grams of receiver material was collected. The trap contained 83 grams of material, of which all but 15 grams evaporated at room temperature, indicating that it was mostly sulfur dioxide. The 132 grams of receiver material and the 15 grams of oil from the trap were combined, diluted with 100 milliliters of diethyl ether and washed twice with 200 milliliter portions of 20 percent sodium chloride solution. The water layer was extracted once with 100 milliliters of diethyl ether and the ether layers were combined. The ether solution was fractionally distilled through a packed column, until the kettle temperature reached 100° C. The pressure was then reduced to 100 millimeters of mercury and 79 grams of 5-hexene-2-one was distilled at 71° C. to 71.5° C. The 5 - hexene - 2 - one had a refractive index of 1.4161–2 ($n$ 30/D.)

*Example 29*

$CH_2=CHCH_2SO_2CH_2CH=CH_2 \rightarrow$
$\qquad CH_2=CHCH_2CH_2CH=CH_2+SO_2$

The same equipment used in Example 1 was charged with 354 grams (2.42 moles) of diallyl sulfone. The temperature in the flask was raised to 190° C. and gradually increased over a seven hour reaction period to 245° C. There was collected 90 grams of distillate in the receiver, 40 grams of low boilers in the Dry Ice cold trap, and 80 grams of residue remained in the distilling flask. The receiver and cold trap fractions were combined, and sulfur dioxide evaporated off, and the remaining material was fractionally distilled to give 55 grams (28 percent yield) of 1,5-hexadiene having a boiling point of 58° C. at atmospheric pressure and a refractive index ($n$ 30/D) of 1.3975–1.3976.

*Example 30*

The equipment used in this example was the same as that described in Example 8, with the tube packed with fresh Filtros. A total of 292 grams (2 moles) of diallyl sulfone was passed through the tube at an average rate of about 60 milliliters an hour while the tube temperature was maintained between 360° C. to 387° C. There was collected 187 grams in the receiver and 80 grams in the cold trap. The sulfur dioxide was evaporated from the cold trap distillate and the residue, 10 grams, was combined with the receiver material. The combined fractions were fractionally distilled to yield 129 grams (79 percent yield) of 1,5-hexadiene boiling at about 60° C. at atmospheric pressure and having a refractive index ($n$ 30/D of 1.3980 to 1.3983.

*Example 31*

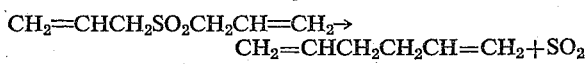

The equipment used in this example was the same as that described in Example 8, with the tube packed with fresh Filtros. A total of 400 grams (2.3 moles) of di-(2-methylallyl) sulfone was passed through the tube at an average rate of about 80 milliliters an hour while the tube temperature was maintained between 374° C. to 383° C. The distillates recovered in the receiver and cold trap were combined after the sulfur dioxide was evaporated off, washed with dilute aqueous basic solution and fractionally distilled. There was obtained 146 grams (58 percent yield) of 2,5-dimethyl-1,5-hexadiene having a boiling point of 57.5° C./100 millimeters and a refractive index ($n$ 30/D) of 1.4238.

In a similar manner one can prepare 2,5-dicyano-1,5-hexadiene from dicyanoallyl sulfone.

*Example 32*

$CH_2=CHCH_2SO_2(CH_2)_4SO_2CH_2CH=CH_2 \rightarrow$
$\qquad CH_2=CH(CH_2)_6CH=CH_2+2SO_2$ The equipment used was similar to that described in Example 1. There was charged 552 grams (2.07 moles) of 1,4-bis-(allylsulfonyl)butane to the distilling flask and heated in the range of 195° C./250 millimeters to 260° C./150 millimeters for several hours, and finally at 180° C./2 millimeters for about an hour. The receiver distillate weighed 99 grams, and the cold trap distillate weighed 227 grams. The two distillate fractions were combined and washed with dilute aqueous sodium hydroxide solution to yield a 120 gram oil fraction. This oil was fractionally distilled and 41 grams of decadienes boiling at 50° C. to 54° C./10 millimeters and having a refractive index range ($n$ 30/D) of 1.4436 to 1.4450 was obtained. The decadiene mixture was further identified as consisting mainly of the 1,9-decadiene isomer.

In a similar manner 2,10-dimethyl-1,10-hendecadiene can be produced from bis-(methylallylsulfonyl)pentane, and 2,10-dichloro-1,10-hendecadiene can be produced from bis(chlorallylsulfonyl)pentane.

*Example 33*

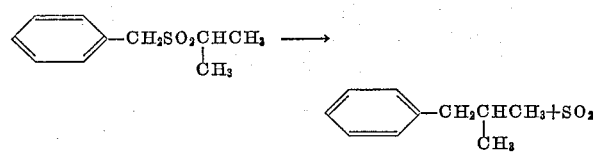

The equipment used in this example was the same as that described in Example 8, with the tube packed with fresh Filtros. A total of 466 grams (2.35 moles) of benzyl isopropyl sulfone was passed through the tube at an average rate of about 95 milliliters an hour while the tube temperature was maintained between 380° C. and 384° C. The product collected in the receiver weighed 387 grams and that in the cold trap weighed 64 grams. The receiver material was distilled to yield 24 grams of a low boiling fraction distilling over at 35° C. to 100° C./40 millimeters; an intermediate fraction of 44 grams in the range of from 116° C. to 125° C./1.2 millimeters; 209 grams of starting material boiling at 130° C. to 140° C./1.2 millimeters; 60 grams of residue in the still; and 14 grams of trap material. The two trap fractions and the 24 gram low boiling fraction were scrubbed through 1500 milliliters of 10 percent aqueous sodium hydroxide. There was obtained about 10 grams of a trap fraction which was identified as propane and propylene by mass spectrometric analysis, and 35 grams of an oil layer. The oil layer was fractionally distilled and 5 grams of isobutylbenzene was recovered and identified. The intermediate fraction of the initial distillation was distilled under reduced pressure and there was recovered 23 grams of bibenzyl at about 100° C./1 millimeter.

What is claimed is:

The process for the production of 1-butene which comprises the pyrolytic rearrangement with simultaneous elimination of sulfur dioxide of allyl methyl sulfone at a temperature of at least about 175° C. but below the decarbonization temperature thereof.

(References on following page)

References Cited by the Examiner

UNITED STATES PATENTS

| | | | |
|---|---|---|---|
| 2,380,832 | 7/45 | Frey et al. | 260—681 |
| 2,502,431 | 4/50 | Copenhaver et al. | 260—681 |

OTHER REFERENCES

Bergmann, "The Chemistry of Acetylene and Related Compounds," 1948, page 80.

Cope et al., J.A.C.S. 72 (1950), pp. 59–67.

Gilman, "Organic Chemistry," vol. 1, second edition, 1943, p. 876.

Naylor et al., J.A.C.S. 76 (1954), pp. 3962–3965.

ALPHONSO D. SULLIVAN, *Primary Examiner*.

CHARLES B. PARKER, *Examiner*.

UNITED STATES PATENT OFFICE
CERTIFICATE OF CORRECTION

Patent No. 3,185,743　　　　　　　　　　　　　　　　May 25, 1965

Edward M. La Combe et al.

It is hereby certified that error appears in the above numbered patent requiring correction and that the said Letters Patent should read as corrected, below.

Column 3, line 19, for "arolyoxy" read -- aroyloxy --; line 46, for "carboaloxy" read -- carboalkoxy --; column 24, line 73, for "decarbonization" read -- carbonization --.

Signed and sealed this 19th day of October 1965.

(SEAL)
Attest:

ERNEST W. SWIDER　　　　　　　　　　　　　　　EDWARD J. BRENNER
Attesting Officer　　　　　　　　　　　　　　　Commissioner of Patents